(12) United States Patent
Craig et al.

(10) Patent No.: US 8,437,882 B2
(45) Date of Patent: May 7, 2013

(54) MANAGING POWER UTILIZED WITHIN A LOCAL POWER NETWORK

(75) Inventors: Jason Craig, Fairfax, VA (US); Richard Daniel Albarran, Bethesda, MD (US); William Pugh, Haymarket, VA (US); Kevin Cassidy, Leesburg, VA (US)

(73) Assignee: InScope Energy, LLC, Reston, VA (US)

( * ) Notice: Subject to any disclaimer, the term of this patent is extended or adjusted under 35 U.S.C. 154(b) by 279 days.

(21) Appl. No.: 12/706,975

(22) Filed: Feb. 17, 2010

(65) Prior Publication Data

US 2011/0202193 A1 Aug. 18, 2011

(51) Int. Cl.
*G05D 3/12* (2006.01)
*G05B 11/01* (2006.01)
*G06F 17/00* (2006.01)

(52) U.S. Cl.
USPC ............. 700/295; 700/22; 700/293; 700/296; 705/412

(58) Field of Classification Search .................... 700/22, 700/295, 296, 292–293; 705/412
See application file for complete search history.

(56) References Cited

U.S. PATENT DOCUMENTS

| | | | | |
|---|---|---|---|---|
| 5,020,411 | A | | 6/1991 | Rowan ........................... 89/1.11 |
| 6,157,527 | A | * | 12/2000 | Spencer et al. ................. 361/64 |
| 6,252,311 | B1 | | 6/2001 | West ................... 307/29 |
| 6,614,204 | B2 | * | 9/2003 | Pellegrino et al. ............ 320/109 |
| 6,816,466 | B1 | | 11/2004 | Daniel ........................... 370/254 |
| 7,353,653 | B2 | | 4/2008 | Bronicki ........................ 60/646 |
| 7,379,791 | B2 | * | 5/2008 | Tamarkin et al. ............ 700/286 |
| 7,402,978 | B2 | * | 7/2008 | Pryor ............................. 320/104 |
| 7,428,816 | B2 | | 9/2008 | Singh et al. ..................... 60/651 |
| 7,719,257 | B2 | | 5/2010 | Robarge et al. ........... 324/117 R |
| 2003/0153216 | A1 | | 8/2003 | Van-Drentham-Susman . 440/45 |
| 2004/0174071 | A1 | | 9/2004 | Nierlich et al. ................. 307/11 |
| 2005/0008904 | A1 | | 1/2005 | Suppes .............................. 429/9 |
| 2005/0084721 | A1 | | 4/2005 | Ikuma et al. .................... 429/22 |
| 2005/0252214 | A1 | | 11/2005 | Goldmeer et al. ............. 60/698 |
| 2006/0049694 | A1 | | 3/2006 | Kates ........................ 307/132 E |
| 2006/0052905 | A1 | | 3/2006 | Pfingsten et al. ............ 700/286 |
| 2006/0228960 | A1 | | 10/2006 | Durling ........................... 440/88 |
| 2006/0261213 | A1 | | 11/2006 | Lavan ............................. 244/30 |
| 2007/0128473 | A1 | | 6/2007 | Durling et al. ................. 429/13 |
| 2007/0128478 | A1 | | 6/2007 | Ballantine et al. ............. 429/17 |
| 2007/0137686 | A1 | | 6/2007 | Durling et al. ................ 136/205 |
| 2008/0019067 | A1 | * | 1/2008 | Reynolds et al. ............ 361/93.1 |
| 2008/0224892 | A1 | | 9/2008 | Bogolea et al. ............ 340/870.3 |
| 2008/0255782 | A1 | | 10/2008 | Bilac et al. ...................... 702/62 |
| 2009/0106571 | A1 | | 4/2009 | Low et al. ...................... 713/310 |
| 2009/0144568 | A1 | * | 6/2009 | Fung ............................ 713/300 |
| 2009/0234512 | A1 | * | 9/2009 | Ewing et al. .................. 700/295 |
| 2010/0030392 | A1 | * | 2/2010 | Ferentz et al. ................ 700/295 |
| 2010/0102625 | A1 | | 4/2010 | Karimi et al. .................. 307/9.1 |
| 2010/0225167 | A1 | | 9/2010 | Stair et al. ....................... 307/29 |
| 2011/0012427 | A1 | | 1/2011 | Craig et al. ..................... 307/29 |

FOREIGN PATENT DOCUMENTS

| WO | WO 2008/113052 | * | 9/2008 |
|---|---|---|---|
| WO | WO 2011/103262 | | 8/2011 |

\* cited by examiner

*Primary Examiner* — Sean Shechtman
(74) *Attorney, Agent, or Firm* — Pillsbury Winthrop Shaw Pittman LLP

(57) ABSTRACT

Power utilized in a local power network may be managed. The local power network may include a power management system. The power management system may communicate with one or more of a circuit controller, a switch controller, and/or an outlet controller in order to manage power utilization.

21 Claims, 6 Drawing Sheets

MANAGING POWER UTILIZED WITHIN A LOCAL POWER NETWORK

FIELD OF THE INVENTION

The invention generally relates to electrical power management. In particular, the invention relates to managing power utilized within a local power network.

BACKGROUND OF THE INVENTION

Systems for distributing power within a local power network (e.g., electrical infrastructure of a building and/or campus) exist. These systems generally include fuse boxes and/or breaker boxes, which lack dynamic functionality. As such, power utilization management such as scheduling is performed in a distributed manner with timers associated with every managed load within the local power network. Such power managements schemes may be subject to inaccuracies in time and constant readjustments due to changes in season and daylight savings. Errors in power utilization management can result in overages in power usage, such as with standby power usage, which have been reported to reach up to 22% of all appliance consumption and around 10% of total residential consumption. Some systems, such as home automation systems, may manage various loads within a local power network merely to enhance convenience, but neglect management of power consumption by those loads.

SUMMARY

One aspect of the invention relates to a local power network. The local power network may include one or more loads. The local power network may include a power management system that may manage power utilization of one or more of the loads. The power management system may be communicatively connected with at least one intelligent distribution board or a constituent component thereof. In some implementations, the power management system and the intelligent distribution board may be integrated as a single device having some or all of the functionalities attributed herein with the power management system and the intelligent distribution board. The intelligent distribution board may be electrically connected and/or communicatively connected with at least one intelligent switch or a constituent component thereof. The intelligent distribution board may be electrically connected and/or communicatively connected with at least one intelligent outlet or a constituent component thereof. In some implementations, the power management system is communicatively coupled with at least one intelligent switch and/or at least one intelligent outlet. The intelligent switches and the intelligent outlets each may be associated with one or more loads. The local power network may include at least one power meter. Electrical power is delivered from a power supply to the loads via power lines or radio frequency that electrically connect constituent components of the local power network.

The loads may include any apparatus that requires electrical power to perform at least one functionality attributed thereto. Examples of the loads may include appliances such as HVAC systems and kitchen appliances, lighting fixtures, consumer electronic devices such as computers and stereos, and/or any other apparatus that can be configured to consume electrical power. Some of the loads may be permanently integrated with the local power network. In contrast, some of the loads may be removably coupled with the local power network. The loads may be controlled in various manners including, but not limited to, turning on, turning off, and/or changing a power level (e.g., brightness for lights, temperature for HVAC systems, and so forth).

The power management system may be configured to manage power utilization of one or more of the loads. Such management may be based at least in part on one or more factors such as, for example, scheduling criteria, planning requirements, business rules, optimization parameters, and/or any other factors. In exemplary implementations, the power management system may provide circuit-level, switch-level, and/or outlet-level power control, monitoring, and/or scheduling. This level of control may be used to eliminate or greatly reduce power consumption by one or more loads that are in standby mode or other modes where power leakage is probable.

The power management system may access, control, and/or manipulate various constituent components of the local power network. In some implementations, the local power network may include or be otherwise associated with more than one power management system working in concert. In some implementations, the power management system may be configured such that a reboot of a processing platform that includes the power management system does not interrupt power delivery within the local power network. The power management system may be located remotely relative to the local power network, for example, within the computing device, and/or located elsewhere.

The intelligent distribution board may include at least one distribution board, at least one circuit controller, and/or other components. The distribution board may include an apparatus configured to divide electrical power, such as that received from the power supply, among constituent components of the local power network. The circuit controller may be configured to control various aspects of the distribution board. According to some implementations, the distribution board and the circuit controller may be integrated as a single component having some or all of the functionalities attributed herein to the distribution board and the circuit controller. In some implementations, the distribution board may be a preexisting distribution board, wherein the circuit controller is utilized to retrofit the preexisting distribution board to form the intelligent distribution board.

The distribution board may include one or more of a breaker panel, fuse box, fuse board, circuit breaker panel, consumer unit, panel board, load center, power breaker, and/or any other apparatus configured to divide electrical power among constituent components of the local power network. The distribution board may include breakers, fuses, and/or other protective devices configured to at least temporarily prevent power from being delivered to constituent component of the local power network. Various constituent components of the local power network may be organized into individual circuits, such that power may be divided among the individual circuits by the distribution board.

As mentioned, various aspects of the distribution board may be controlled by the circuit controller. For example, the circuit controller may be configured control the distribution board so as to disconnect, energize, and/or otherwise control one or more individual circuits in the local power network. The circuit controller may be configured to receive and/or exchange information with the power management system. The circuit controller may control aspects of the distribution board based at least in part on information received from the power management system.

The intelligent switches may each include at least one switch and/or one switch controller. From a user's perspective, the intelligent switches may function similarly to traditional household wall switches. The switch, for example, may include an apparatus configured to reversibly connect and disconnect, electrically, a load. When that load is electrically connected, power may be provided to that load. Conversely, when that load is electrically disconnected, power delivery to that load is prevented. The switch controller may be configured to control the switch. In some implementations, the switch and the switch controller may be integrated as a single component having some or all of the functionalities attributed herein to the switch and the switch controller. According to some implementations, the switch may be a preexisting switch, wherein the switch controller is utilized to retrofit the preexisting switch to form an intelligent switch.

As indicated, the switch may include an apparatus configured to reversibly connect and disconnect, electrically, a load. Examples of such apparatus that may be configured to reversibly connect and disconnect loads in the local power network may include a push button switch, a toggle switch, an illuminated switch, a rocker switch, a tamper resistant switch, a voltage class switch, a mercury switch, a pull chain or pull cord switch, a dimmer switch, an electronic switch, and so forth. In one non-limiting example, the load may include a light fixture and the switch may include a light switch configured to turn the light fixture on and off. The switch may facilitate two-way, three-way, four-way, and/or double-pole wiring schemes.

The switch, as mentioned, may be controlled by the switch controller. For example, the switch controller may be configured to modulate or actuate the switch. The switch controller may be configured to receive and/or exchange information with the power management system. As such, the switch controller may modulate the switch based at least in part on information received from the power management system.

The intelligent outlets may each include at least one outlet receptacle and/or at least one outlet controller. From a user's perspective, the intelligent outlets may function similarly to traditional household wall outlets. The outlet receptacle may include an apparatus configured to facilitate a removable connection between, for example, an intelligent outlet and a load. The outlet controller may be configured to control an aspect of the outlet receptacle. In accordance with some implementations, the outlet receptacle and the outlet controller may be integrated as a single component having some or all of the functionalities attributed herein to the outlet receptacle and the outlet controller. In some implementations, the outlet receptacle may be a preexisting outlet receptacle, wherein the outlet controller is utilized to retrofit the preexisting outlet receptacle to form an intelligent outlet.

As an apparatus configured to facilitate removable connections between an intelligent outlet and a load, the outlet receptacle may include, for example, one or more female electrical connectors such as power sockets, electric receptacles, and/or electrical outlets. A female electrical connector may have slots and/or holes that accept and deliver power to prongs of inserted plugs. By way of non-limiting example, the load may include a kitchen appliance having a cord with a plug at the end that may be inserted into the outlet receptacle in order to electrically connect the kitchen appliance to the intelligent outlet and, thus, receive electrical power.

As noted above, the outlet controller may control aspects of the outlet receptacle. More specifically, according to various implementations, the outlet controller may control the outlet receptacle such that power is prevented from being provided to a connected load. The outlet controller may be configured to receive and/or exchange information with the power management system. The control of the outlet controller by the outlet receptacle may be based at least in part on information received from the power management system.

The power meter may include any device or apparatus configured to measure electrical power delivered by a power line. The power meter may measure, for example, one or more of line current, line voltage, and/or other factors useful in determining power. The power meter may be positioned in-line between the power supply and the intelligent distribution board. In such a configuration, the power meter may determine an amount of power delivered to the local power network over a period of time. The power meter may be positioned in-line between various constituent components of the local power network. For example, the power meter may be positioned between the intelligent distribution board and an intelligent outlet in order to determine an amount of power transmitted between the intelligent distribution board and that intelligent outlet. It will be appreciated that the local power network may include any number of power meters, which may be positioned in any number of locations within the local power network. Information determined by the power meter may be obtained by other constituent component of the local power network in some implementations.

Another aspect of the invention relates to a power management system that may be invoked in a local power network. The power management system may be configured to manage power utilization of one or more loads. The power management system may include an electronic storage and a processor. The processor may be configured to execute one or more of an interface module; a communications module; a power utilization monitoring module; a load identification module; a power conservation module that may include one or more of a scheduling sub-module, a business rules sub-module, a usage profile sub-module, an artificial intelligence sub-module, and/or other sub-modules; and/or other modules/sub-modules.

The interface module may be configured to receive, from a user, a set of power management parameters. In some implementations, the interface module may be further configured to provide a graphical user interface to facilitate receiving the set of power management parameters. Alternatively or additionally, the set of power management parameters may be received from the user via a processing platform that is entirely discrete and separate from the power management system such as a computing device communicatively coupled with the power management system. Power management parameters may include any parameter associated with loads or other constituent components of the local power network. By way of non-limiting example, some power management parameters are described in connection various modules and sub-modules herein. Generally speaking, the interface module may be used in conjunction with one or more interface devices.

The communications module may be configured to transfer information between the power management system and one or more constituent components of the local power network via one or more communicative connections. For example, the communications module may transmit an instruction to the intelligent distribution board, one or more intelligent switches, one or more intelligent outlets, and/or constituent components thereof.

The power utilization monitoring module may be configured to determine an amount of power utilized by at least one of the loads. Such a determination may be made through direct monitoring of power utilization. Additionally or alternatively, the determination may be based at least in part on information received from other constituent components of the local power network indicative of power usage of associated loads. In some implementations, the power utilization monitoring module may be configured to calculate an electric bill estimation based at least in part on the amount of power utilized by the loads and costs associated with power delivered from the power supply. A report may be generated that conveys information about power utilization within the local power network such as, for example, individual outlet utilization, individual circuit utilization, power usage as a function of time, and so forth. Such a report may be presented by the interface module.

The load identification module may be configured to obtain an identity of at least one of the loads. In some implementations, the identity is sensed based on usage profiles of a given load. The identity may be provided by a user, such as via the interface module. The identity may be transmitted directly from the load, via an intelligent switch, and/or via an intelligent outlet.

The power conservation module may be configured to generate instructions for other constituent components of the local power network. The generated instructions may be intended to effectuate energization and deactivation of one or more circuits in the local power network and/or one or more of the loads. The generated instructions may be based at least in part on any number of power management parameters. For example, the generated instructions may be based at least in part on the identity of at least one of the loads. The generated instructions may be based at least in part one power management parameters of the scheduling sub-module, the business rules sub-module, and/or the usage profile sub-module.

The scheduling sub-module may be configured to manage a schedule associated with at least one of the loads. Such a schedule may be indicative of time periods of energization and deactivation of the one or more circuits and/or the one or more of the loads. For example, a schedule may indicate that a circuit containing a particular load is to be deactivated from 1:00 AM to 5:00 AM on weekdays. A schedule may be statically or dynamically established, and may be based at least in part on one or more of preset time periods, occupancy sensors, daylight sensors, computed dusk/dawn time, holiday schedules, and/or any other timing indicator. The instructions generated by the power conservation module may be based at least in part on the schedule.

The business rules sub-module may be configured to manage one or more business rules associated with the local power network. A business rule may be a statement that defines or constrains some aspect of a business. A business rule may be intended to assert business structure or to control or influence the behavior of a business. Individual business rules that describe the same facet of a business may be arranged into business rule sets. Business rules may describe operations, definitions, and constraints that apply the loads or various circuits to aid a business in achieving its goals. The instructions generated by the power conservation module may be based at least in part on the business rules.

The usage profile sub-module may be configured to determine time periods of energization and deactivation of one or more circuits and/or one or more of the loads based at least in part on a usage profile of one or more of the loads. A usage profile, for example, may include a historical usage pattern of a particular load. As an illustration, when the usage profile sub-module determines, based on power consumption or some other factor, that a given load is in standby mode during certain times, the usage profile sub-module may inform the power conservation module to generate instructions to deactivate that given load during those certain times.

The artificial intelligence sub-module may be configured to adaptively manage goals associated with power utilization. More specifically, power utilization may be controlled to achieve one or more desired goals such as meeting a power usage limit, budget constraints, and/or safety targets. Goals may be default goals, specified by a user, downloaded, configured automatically, and/or obtained by any other manner or from any source. The artificial intelligence sub-module may observe an environment of the local power network to determine routines and to respond accordingly. The artificial intelligence sub-module may be configured manage and/or schedule power utilization by loads based at least in part on external events and/or input. The instructions generated by the power conservation module may be based at least in part on goals managed by the artificial intelligence sub-module.

Another aspect of the invention relates to a circuit controller that may be invoked, in conjunction with a power management system, in a local power network. The circuit controller may be configured to control various aspects of a distribution board. For example, the circuit controller may be configured to reversibly effectuate energization and deactivation of one or more circuits to which the distribution board divides power. The circuit controller may include an electronic storage and a processor. The processor may be configured to execute one or more of a communications module, a circuit regulator module, a power utilization monitoring module, a load identification module, and/or other modules/sub-modules.

The communications module may be configured to transfer information (e.g., instruction) to and from the power management system via a communicative connection. For example, the communications module may receive an instruction from the power management system to energize or deactivate one or more circuits to which the distribution board divides power among.

The circuit regulator module may be configured to reversibly effectuate energization and deactivation of the one or more circuits and/or one or more of the loads in response to instructions received from the power management system. For example, execution of the circuit regulator module may cause a breaker having controlled switching capability included in the distribution board to deactivate a particular circuit in response to a received instruction to deactivate a given load contained in that particular circuit.

The power utilization monitoring module may be configured to determine an indication of an amount of power utilized by at least one circuit or at least one of the loads. Such a determination may be made through direct monitoring of power utilization. Additionally or alternatively, the indication may be transmitted to the power management system via the communications module.

The load identification module may be configured to obtain an identity of at least one of the loads. In some implementations, the identity is sensed based on usage profiles of a given load. The identity may be provided by a user. The identity may be received directly from the load. The identity may be transmitted to the power management system via the communications module.

Another aspect of the invention relates to a switch controller that may be invoked, in conjunction with a power management system, in a local power network. The switch controller may be configured to control a switch. For example, the switch controller may be configured to reversibly effectuate energization and deactivation of one or more loads connected with an associated switch. The switch controller may include an electronic storage and a processor. The processor may be configured to execute one or more of a communications module, a switch regulator module, a power utilization monitoring module, a load identification module, and/or other modules/sub-modules.

The communications module may be configured to transfer information to and from the power management system via a communicative connection. For example, the communications module may receive an instruction from the power management system to energize or deactivate a load connected to an associated switch.

The switch regulator module may be configured to reversibly effectuate energization and deactivation of one or more of the loads connected to an associated switch in response to instructions received from the power management system. For example, execution of the switch regulator module may cause a switch to be actuated to deactivate a particular load in response to a received instruction to deactivate that given load.

The power utilization monitoring module may be configured to determine an indication of an amount of power utilized by at least one of the loads. Such a determination may be made through direct monitoring of power utilization. For loads included in a given circuit that are not directly monitored, the determination of power utilization may be computed such as by subtracting the power utilization of monitored loads in the given circuit from the total power utilization of the given circuit. Trending may be invoked to determine power utilization such as by comparing circuit power utilization before and after a given load is energized. Additionally or alternatively, the indication may be transmitted to the power management system via the communications module.

The load identification module may be configured to obtain an identity of at least one of the loads. In some implementations, the identity is sensed based on usage profiles of a given load. The identity may be provided by a user. The identity may be received directly from the load. The identity may be transmitted to the power management system via the communications module.

Another aspect of the invention relates to an outlet controller that may be invoked, in conjunction with a power management system, in a local power network. The outlet controller may be configured to control an aspect of an outlet receptacle. For example, the outlet controller may be configured to reversibly effectuate energization and deactivation of one or more loads connected to an associated outlet receptacle. The outlet controller may include an electronic storage and a processor. The processor may be configured to execute one or more of a communications module, a outlet regulator module, a power utilization monitoring module, a load identification module, and/or other modules/sub-modules.

The communications module may be configured to transfer information to and from the power management system via a communicative connection. For example, the communications module may receive an instruction from the power management system to energize or deactivate a load connected to an associated outlet receptacle.

The outlet regulator module may be configured to reversibly effectuate energization and deactivation of one or more of the loads connected to an associated outlet receptacle in response to instructions received from the power management system. For example, execution of the outlet regulator module may cause an internal switching mechanism of an associated intelligent outlet to be actuated to deactivate a particular load in response to a received instruction to deactivate that given load.

The power utilization monitoring module may be configured to determine an indication of an amount of power utilized by at least one of the loads. Such a determination may be made through direct monitoring of power utilization. Additionally or alternatively, the indication may be transmitted to the power management system via the communications module.

The load identification module may be configured to obtain an identity of at least one of the loads. In some implementations, the identity is sensed based on usage profiles of a given load. The identity may be provided by a user. The identity may be received directly from the load. The identity may be transmitted to the power management system via the communications module.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
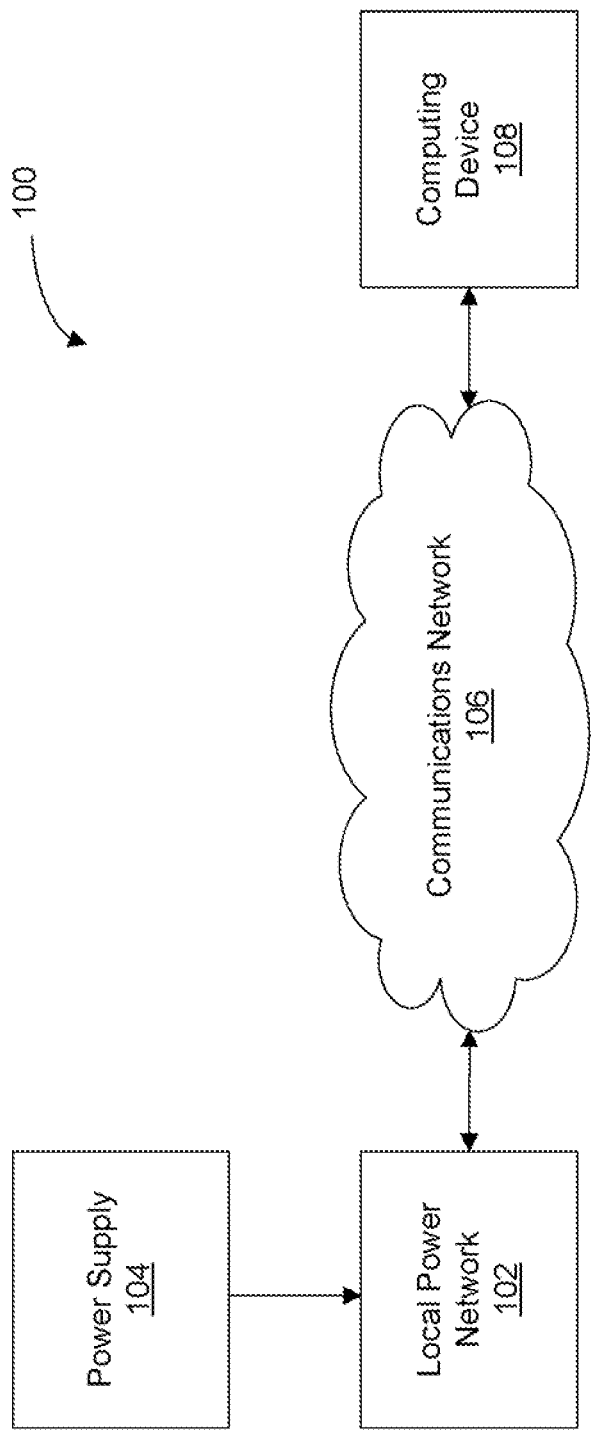
FIG. 1 illustrates an exemplary environment in which implementations of the present technology may be practiced.

FIG. 1 illustrates an exemplary environment 100 in which implementations of the present technology may be practiced. The environment 100 may include at least one local power network 102 that may receive electrical power from at least one power supply 104. The local power network 102 may include an electrical infrastructure of a structure, group of structures, vehicle, vessel, and any other system that may utilize electrical power. Examples of structures include permanent buildings such as office buildings, brick and mortar commercial storefronts, apartment buildings, houses, other dwellings, and so forth. A structure may include a temporary structure such as a tent or other structure that is meant to be temporarily erected. Groups of structures may include, for example, a university campus, a business park, and the like. A vehicle may include a car or truck, whereas a vessel may include a boat or other marine vehicle. The local power network 102 is described further in connection with FIG. 2.

One or more constituent components of the local power network 102 may be communicatively coupled with a communications network 106. One or more computing devices such as computing device 108 may be communicatively coupled with the communications network 106. The communications network 106 may facilitate transfer of information between the computing device 108 and one or more constituent components of the local power network 102. Although FIG. 1 depicts one local power network (i.e., local power network 102), it is noteworthy that the environment 100 may include any number of local power networks.

The power supply 104 may include any source of electrical power. For example, the power supply 104 may include remote power generation installation such as power plant. Such a power plant may include coal-burning power plant, a nuclear power plant, and so on. As another example, the power supply 104 may include a power generator that converts tidal energy of the ocean into power that is usable within the local power network 102. Additionally or alternatively, the power supply 104 may include a local power generation installation such as one or more solar cells that convert electromagnetic radiation from the sun to power that is usable within the local power network 102. The power supply 104 may include a portable generator that operates, for example, on gasoline. The power supply 104 may include power storage devices such as batteries and/or capacitive storage devices. According to some implementations, the power supply 104 may be contained within the local power network 102.

The communications network 106 may include hardware and/or software that facilitate the transfer of information. For example, the communications network 106 may include the Internet, an intranet, a wide-area network, a local-area network, or any combination thereof. According to various implementations, the communications network 106 may include wired portions and/or wireless portions.

The computing device 108 may include any device that is capable of sending information to and/or receiving information from one or more constituent components of the local power network 102 via the communications network 106. Examples of the computing device 108 may include personal computers such as desktops and laptops, workstations, servers, handheld devices such as personal digital assistants, and so forth. In some implementations, the computing device 108 may host or provide access to an interface (e.g., a web-based interface) that allows a user or administrator to access, control, and/or manipulate one or more constituent components of the local power network 102. Such an interface may include a graphical user interface provided on the computing device 108. The graphical user interface may be configured to receive, such as from a user of the computing device 108, a set of power management parameters to by utilized by the power management system 204.

Figure 2:
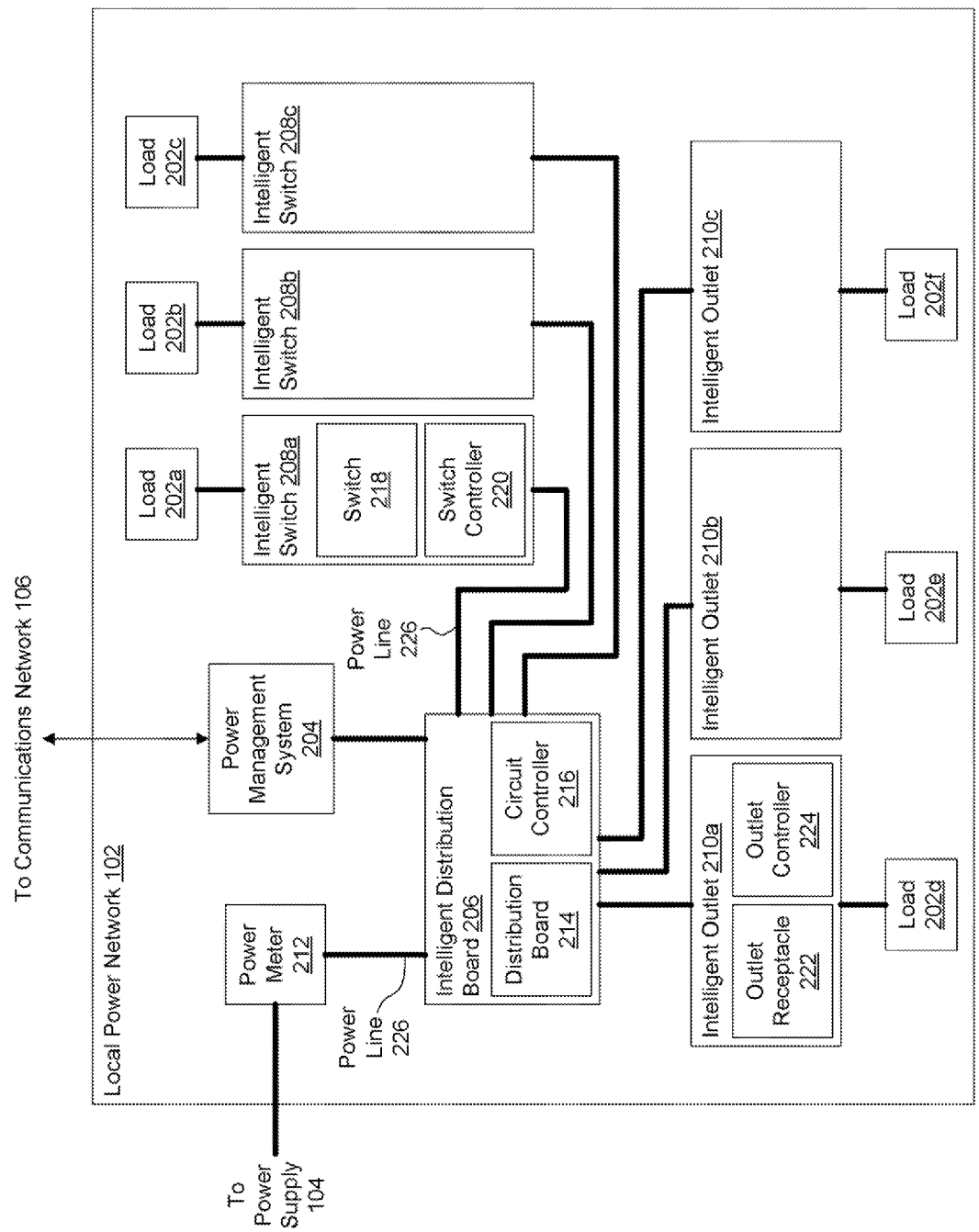
FIG. 2 illustrates a block diagram of an exemplary implementation of a local power network.

FIG. 2 illustrates a block diagram of an exemplary implementation of the local power network 102 depicted in FIG. 1. The local power network 102 may include one or more loads such as loads 202a, 202b, 202c, 202d, 202e, and 202f. The local power network 102 may include a power management system 204 that may manage power utilization of one or more of the loads 202. The power management system 204 may be communicatively connected with at least one intelligent distribution board 206 or a constituent component thereof. In some implementations, the power management system 204 and the intelligent distribution board 206 may be integrated as a single device having some or all of the functionalities attributed herein with the power management system 204 and the intelligent distribution board 206. The intelligent distribution board 206 may be electrically connected and/or communicatively connected with at least one intelligent switch (e.g., intelligent switches 208a, 208b, and/or 208c) or a constituent component thereof. The intelligent distribution board 206 may be electrically connected and/or communicatively connected with at least one intelligent outlet (e.g., intelligent outlets 210a, 210b, and/or 210c) or a constituent component thereof. In some implementations, the power management system 204 is communicatively couple with at least one intelligent switch 208 and/or at least one intelligent outlet 210. The intelligent switches 208 and the intelligent outlets 210 each may be associated with one or more loads (e.g., loads 202). The local power network 102 may include at least one power meter 212. Electrical power is delivered from the power supply 104 to the loads 202 via power lines (e.g., power lines 226) that electrically connect constituent components of the local power network 102.

Communicative connections between constituent components of the local power network 102 may take on any of a variety of forms. Such communicative connections may include any means for sending, receiving, and/or exchanging information between two or more constituent components of the local power network 102. In some implementations, modulated carrier signals are impressed on the power lines (e.g., power lines 226) of the local power network 102. As such, the same power lines used for power transmission may be used to transfer information between constituent components of the local power network 102. Examples of such power line communication may include a power line digital subscriber line (PDSL), mains communication, power line telecom (PLT), power line networking (PLN), broadband over power lines (BPL), and/or any other power line communication technology. Wired information transfer technologies (e.g., Ethernet) and/or wireless information transfer technologies (e.g., WiFi or other RF technology) may be utilized as one or more communicative connections.

The loads 202 may include any apparatus that requires electrical power to perform at least one functionality attributed thereto. Examples of the loads 202 may include appliances such as HVAC systems and kitchen appliances, lighting fixtures, consumer electronic devices such as computers and stereos, and/or any other apparatus that can be configured to consume electrical power. some of the loads 202 may be permanently integrated with the local power network 102. By way of non-limiting example, the load 202a may include a lighting fixture that is permanently installed (i.e., hard-wired) in a building that includes the local power network 102 such that a connection between the load 202 and the intelligent switch 208a is substantially permanent. In contrast, some of the loads 202 may be removably coupled with the local power network 102. The load 202d, again by way of non-limiting example, may include a personal computer that is removably connected with the intelligent outlet 210a. The loads 202 may be controlled in various manners including, but not limited to, turning on, turning off, and/or changing a power level (e.g., brightness for lights, temperature for HVAC systems, and so forth).

The power management system 204 may be configured to manage power utilization of one or more of the loads 202. Such management may be based at least in part on one or more factors such as, for example, scheduling criteria, planning requirements, business rules, optimization parameters, and/or any other factors. In exemplary implementations, the power management system 204 may provide circuit-level, switch-level, and/or outlet-level power control, monitoring, and/or scheduling. This level of control may be used to eliminate or greatly reduce power consumption by one or more loads 202 that are in standby mode or other modes where power leakage is probable.

The power management system 204 may access, control, and/or manipulate various constituent components of the local power network 102. In some implementations, the local power network 102 may include or be otherwise associated with more than one power management system (e.g., power management system 204) working in concert. In some implementations, the power management system 204 may be configured such that a reboot of a processing platform that includes the power management system 204 does not interrupt power delivery within the local power network 102. The power management system 204 may be located remotely relative to the local power network 102, for example, within the computing device 108, and/or located elsewhere. An exemplary implementation of the power management system 204 is described in further detail in connection with FIG. 3.

The intelligent distribution board 206 may include at least one distribution board 214, at least one circuit controller 216, and/or other components. The distribution board 214 may include an apparatus configured to divide electrical power, such as that received from the power supply 104, among constituent components of the local power network 102. The circuit controller 216 may be configured to control various aspects of the distribution board 214. According to some implementations, the distribution board 214 and the circuit controller 216 may be integrated as a single component having some or all of the functionalities attributed herein to the distribution board 214 and the circuit controller 216. In some implementations, the distribution board 214 may be a preexisting distribution board, wherein the circuit controller 216 is utilized to retrofit the preexisting distribution board to form the intelligent distribution board 206.

The distribution board 214 may include one or more of a breaker panel, fuse box, fuse board, circuit breaker panel, consumer unit, panel board, load center, power breaker, and/or any other apparatus configured to divide electrical power among constituent components of the local power network 102. The distribution board 214 may include breakers, fuses, and/or other protective devices configured to at least temporarily prevent power from being delivered to constituent component of the local power network 102. Various constituent components of the local power network 102 may be organized into individual circuits, such that power may be divided among the individual circuits by the distribution board 214. By way of non-limiting example, the intelligent outlet 210a and any loads connected thereto (e.g., the load 202d), the intelligent outlet 210b and any loads connected thereto (e.g., the load 202e), and the intelligent switch 208a with the load 202a connected thereto may be included in a single circuit and draw power from that single circuit.

As mentioned, various aspects of the distribution board 214 may be controlled by the circuit controller 216. For example, the circuit controller 216 may be configured control the distribution board 214 so as to disconnect, energize, and/or otherwise control one or more individual circuits in the local power network 102. The circuit controller 216 may be configured to receive and/or exchange information with the power management system 204. The circuit controller 216 may control aspects of the distribution board 214 based at least in part on information received from the power management system 204. To illustrate, by way of non-limiting example, the circuit controller 216 may modulate a breaker of the distribution board 214 in order to cutoff power supplied to a circuit based on an instruction received from the power management system 204. An exemplary implementation of the circuit controller 216 is described in further detail in connection FIG. 4.

The intelligent switches 208 may each include at least one switch 218 and/or one switch controller 220 (see, e.g., intelligent switch 208a). From a user's perspective, the intelligent switches may function similarly to traditional household wall switches. The switch 218, for example, may include an apparatus configured to reversibly connect and disconnect, electrically, the load 202a. When the load 202a is electrically connected, power may be provided to the load 202a. Conversely, when the load 202a is electrically disconnected, power delivery to the load 202a is prevented. The switch controller 220 may be configured to control the switch 218. In some implementations, the switch 218 and the switch controller 220 may be integrated as a single component having some or all of the functionalities attributed herein to the switch 218 and the switch controller 220. According to some implementations, the switch 218 may be a preexisting switch, wherein the switch controller 220 is utilized to retrofit the preexisting switch to form an intelligent switch such as the intelligent switch 208a.

As indicated, the switch 218 may include an apparatus configured to reversibly connect and disconnect, electrically, the load 202a. Examples of such apparatus that may be configured to reversibly connect and disconnect loads in the local power network 102 may include a push button switch, a toggle switch, an illuminated switch, a rocker switch, a tamper resistant switch, a voltage class switch, a mercury switch, a pull chain or pull cord switch, a dimmer switch, an electronic switch, and so forth. In one non-limiting example, the load 202a may include a light fixture and the switch 218 may include a light switch configured to turn the light fixture on and off. The switch 218 may facilitate two-way, three-way, four-way, and/or double-pole wiring schemes.

The switch 218, as mentioned, may be controlled by the switch controller 220. For example, the switch controller 220 may be configured to modulate the switch 218. The switch controller 220 may be configured to receive and/or exchange information with the power management system 204. As such, the switch controller 220 may modulate the switch 218 based at least in part on information received from the power management system 204. As a non-limiting illustration, the switch controller 220 may modulate the switch 218 so that power is disconnected from the load 220a based on an instruction received from the power management system 204. An exemplary implementation of the switch controller 220 is described in further detail in connection with FIG. 5.

The intelligent outlets 210 may each include at least one outlet receptacle 222 and/or at least one outlet controller 224 (see, e.g., intelligent outlet 210a). From a user's perspective, the intelligent outlets 210 may function similarly to traditional household wall outlets. The outlet receptacle 222 may include an apparatus configured to facilitate a removable connection between, for example, the intelligent outlet 210a and the load 202d. The outlet controller 224 may be configured to control an aspect of the outlet receptacle 222. In accordance with some implementations, the outlet receptacle 222 and the outlet controller 224 may be integrated as a single component having some or all of the functionalities attributed herein to the outlet receptacle 222 and the outlet controller 224. In some implementations, the outlet receptacle 222 may be a preexisting outlet receptacle, wherein the outlet controller 224 is utilized to retrofit the preexisting outlet receptacle to form an intelligent outlet such as the intelligent outlet 210a.

As an apparatus configured to facilitate removable connections between an intelligent outlet 210 and a load 202, the outlet receptacle 222 may include, for example, one or more female electrical connectors such as power sockets, electric receptacles, and/or electrical outlets. A female electrical connector may have slots and/or holes that accept and deliver power to prongs of inserted plugs. By way of non-limiting example, the load 202d may include a kitchen appliance having a cord with a plug at the end that may be inserted into the outlet receptacle 222 in order to electrically connect the kitchen appliance to the intelligent outlet 210a and, thus, receive electrical power.

As noted above, the outlet controller 224 may control aspects of the outlet receptacle 222. More specifically, according to various implementations, the outlet controller 224 may control the outlet receptacle 222 such that power is prevented from being provided to a connected load 202. The outlet controller 224 may be configured to receive and/or exchange information with the power management system 204. The control of the outlet controller 224 by the outlet receptacle 222 may be based at least in part on information received from the power management system 204. According to a non-limiting example, the outlet controller 224 may control the outlet receptacle 222 such that power ceases to be provided to the load 202d based on an instruction received from the power management system 204. An exemplary implementation of the outlet controller 224 is described in further detail in connection with FIG. 6.

The power meter 212 may include any device or apparatus configured to measure electrical power delivered by a power line. The power meter 212 may measure, for example, one or more of line current, line voltage, and/or other factors useful in determining power. As shown in FIG. 2, the power meter 212 may be positioned in-line between the power supply 104 and the intelligent distribution board 206. In such a configuration, the power meter 212 may determine an amount of power delivered to the local power network 102 over a period of time. The power meter 212 may be positioned in-line between various constituent components of the local power network 102. For example, the power meter 212 may be positioned between the intelligent distribution board 206 and the intelligent outlet 210a in order to determine an amount of power transmitted between the intelligent distribution board 206 and the intelligent outlet 210a. It will be appreciated that the local power network 102 may include any number of power meters similar to power meter 212, which may be positioned in any number of locations within the local power network 102. Information determined by the power meter 212 may be obtained by other constituent component of the local power network 102 in some implementations.

Figure 3:
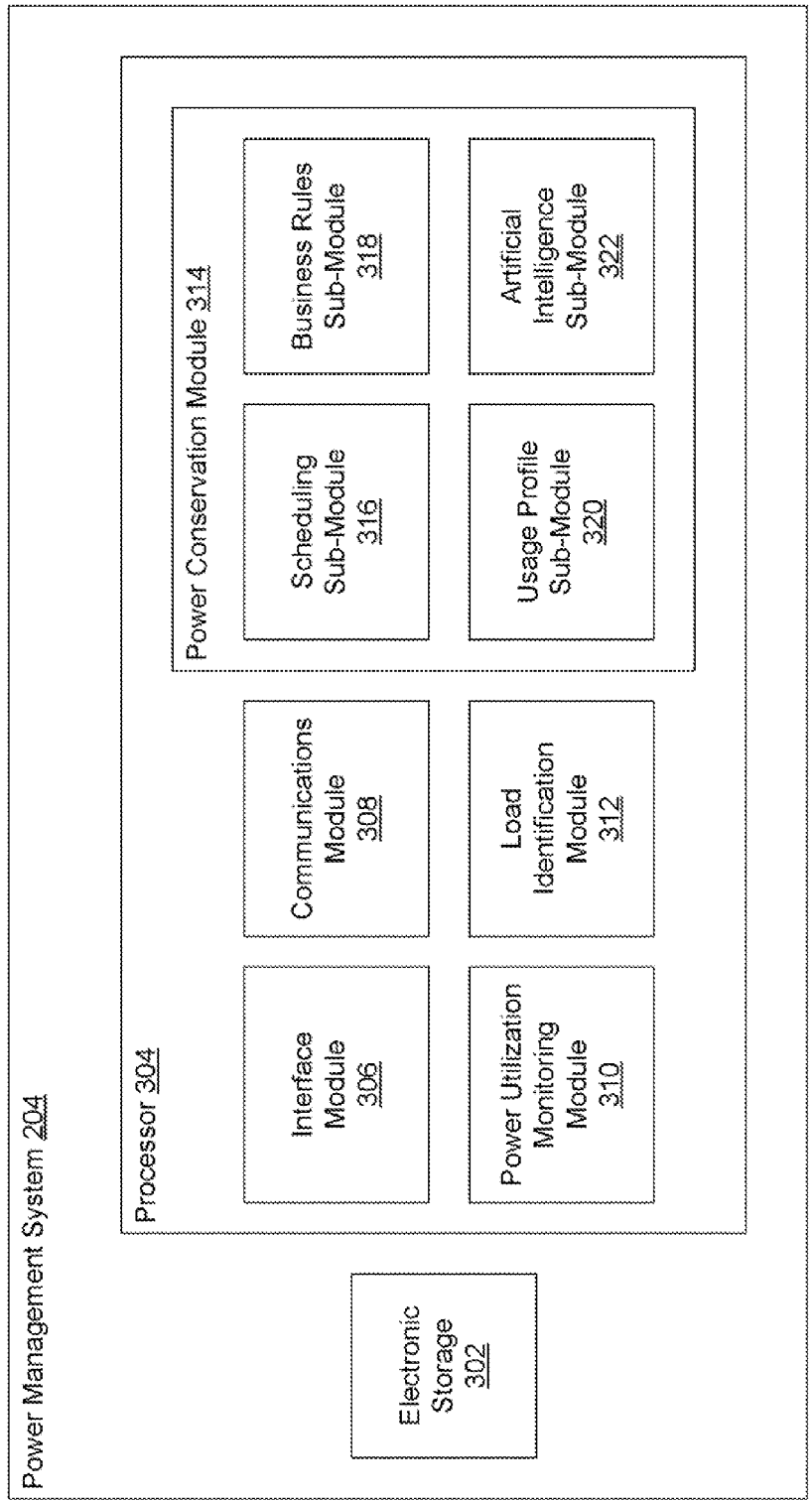
FIG. 3 illustrates an exemplary implementation of a power management system.

FIG. 3 illustrates an exemplary implementation of the power management system 204 described in connection with FIG. 2. The power management system 204 may be configured to manage power utilization of one or more loads, such as the loads 202 described in connection with FIG. 2. The power management system 204 may include an electronic storage 302 and a processor 304.

Electronic storage 302 may include electronic storage media that electronically stores information. The electronically storage media of electronic storage 302 may include one or both of system storage that is provided integrally (i.e., substantially non-removable) with the power management system 204 and/or removable storage that is removably connectable to the power management system 204 via, for example, a port (e.g., a USB port, a firewire port, etc.) or a drive (e.g., a disk drive, etc.). Electronic storage 302 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 302 may store software algorithms, information determined by the processor 304, information received via a user interface such as that which may be provided by computing device 108 or a user interface integral with the power management system 204, and/or other information that enables the power management system 204 to function properly. Electronic storage 302 may be a separate component within the power management system 204, or electronic storage 302 may be provided integrally with one or more other components of the power management system 204 (e.g., the processor 304).

The processor 304 may be configured to provide information processing capabilities in the power management system 204. As such, the processor 304 may include one or more of a digital processor, an analog processor, a digital circuit designed to process information, an analog circuit designed to process information, a state machine, and/or other mechanisms for electronically processing information. Although the processor 304 is shown in FIG. 3 as a single entity, this is for illustrative purposes only. In some implementations, the processor 304 may include a plurality of processing units. These processing units may be physically located within the same device, or the processor 304 may represent processing functionality of a plurality of devices operating in coordination.

As is shown in FIG. 3, the processor 304 may be configured to execute one or more computer program modules and/or sub-modules. The one or more computer program modules and/or sub-modules may include one or more of an interface module 306; a communications module 308; a power utilization monitoring module 310; a load identification module 312; a power conservation module 314 that may include one or more of a scheduling sub-module 316, a business rules sub-module 318, a usage profile sub-module 320, artificial intelligence sub-module 322, and/or other sub-modules; and/or other modules/sub-modules. The processor 304 may be configured to execute modules/sub-modules 306, 308, 310, 312, 314, 316, 318, 320 and/or 322 by software; hardware; firmware; some combination of software, hardware, and/or firmware; and/or other mechanisms for configuring processing capabilities on the processor 304.

It should be appreciated that although modules/sub-modules 306, 308, 310, 312, 314, 316, 318, 320, and 322 are illustrated in FIG. 3 as being co-located within a single processing unit, in implementations in which the processor 304 includes multiple processing units, one or more of modules/sub-modules 306, 308, 310, 312, 314, 316, 318, 320, and/or 322 may be located remotely from the other modules/sub-modules. The description of the functionality provided by the different modules/sub-modules 306, 308, 310, 312, 314, 316, 318, 320, and/or 322 described below is for illustrative purposes, and is not intended to be limiting, as any of modules/sub-modules 306, 308, 310, 312, 314, 316, 318, 320, and/or 322 may provide more or less functionality than is described. For example, one or more of modules/sub-modules 306, 308, 310, 312, 314, 316, 318, 320, and/or 322 may be eliminated, and some or all of its functionality may be provided by other ones of modules/sub-modules 306, 308, 310, 312, 314, 316, 318, 320, and/or 322. As another example, the processor 304 may be configured to execute one or more additional modules and/or sub-modules that may perform some or all of the functionality attributed below to one of modules/sub-modules 306, 308, 310, 312, 314, 316, 318, 320, and/or 322.

The interface module 306 may be configured to receive, from a user, a set of power management parameters. In some implementations, the interface module 306 may be further configured to provide a graphical user interface to facilitate receiving the set of power management parameters. Alternatively or additionally, the set of power management parameters may be received from the user via a processing platform that is entirely discrete and separate from the power management system 204 such as the computing device 108 described in connection with FIG. 1. Power management parameters may include any parameter associated with the loads 202 or other constituent components of the local power network 102. By way of non-limiting example, some power management parameters are described in connection various modules and sub-modules herein. According to some implementations, the interface module 306 may facilitate automatic discovery and configuration (e.g., "plug and play") of various controllers in the local power network 102 such as the circuit controller 216, the switch controller 220, and/or the outlet controller 224.

Generally speaking, the interface module 306 may be used in conjunction with one or more interface devices (not depicted in FIG. 3). Such interface devices may be configured to provide an interface between a user and the power management system 204 through which the user may provide information to and receive information from the power management system 204. This enables data, results, and/or instructions and any other communicable items, collectively referred to as "information," to be communicated between the user and the power management system 204. Examples of interface devices may include a keypad, buttons, switches, a keyboard, knobs, levers, a display screen, a touch screen, speakers, a microphone, an indicator light, an audible alarm, and a printer.

It is to be understood that other communication techniques, either hard-wired or wireless, are contemplated by the present invention to be used in conjunction with the interface module 306. For example, the present invention contemplates that an interface device may be integrated with a removable storage interface provided by electronic storage 302. In this example, information may be loaded into the power management system 204 from removable storage (e.g., a smart card, a flash drive, a removable disk, etc.) that enables the user(s) to customize the implementation of the power management system 204. Other exemplary input devices and techniques adapted for use with the power management system 204 as an interface device utilized in conjunction with the interface module 306 include, but are not limited to, an RS-232 port, RF link, an IR link, modem (telephone, cable or other). In short, any technique for communicating information with the power management system 204 is contemplated by the present invention to be utilized in conjunction with the interface module 306.

The communications module 308 may be configured to transfer information (e.g., instructions) between the power management system 204 and one or more constituent components of the local power network 102 via one or more communicative connections. For example, the communications module 308 may transmit an instruction to the intelligent distribution board 206, one or more intelligent switches 208, one or more intelligent outlets 210, and/or constituent components thereof. As mentioned herein, communicative connections may include any means for sending, receiving, and/or exchanging information between two or more constituent components of the local power network 102.

The power utilization monitoring module 310 may be configured to determine an amount of power utilized by at least one of the loads 202. Such a determination may be made through direct monitoring of power utilization. For loads included in a given circuit that are not directly monitored, the determination of power utilization may be computed such as by subtracting the power utilization of monitored loads in the given circuit from the total power utilization of the given circuit. Trending may be invoked to determine power utilization such as by comparing circuit power utilization before and after a given load is energized. Additionally or alternatively, the determination may be based at least in part on information received from other constituent components of the local power network 102 (e.g., the intelligent switches 208 and/or the intelligent outlets 210) indicative of power usage of associated loads 202. In some implementations, the power utilization monitoring module 310 may be configured to calculate an electric bill estimation based at least in part on the amount of power utilized by the loads 202 and costs associated with power delivered from the power supply 104. A report may be generated that conveys information about power utilization within the local power network 102 such as, for example, individual outlet utilization, individual circuit utilization, power usage as a function of time, and so forth. Such a report may be presented by the interface module 306.

According to some implementations, the power utilization monitoring module 310 may monitor voltage in the distribution board 214 to provide equipment protection, power quality monitoring, and/or other information or safeguards associated with voltage. An example of equipment protection may include inhibiting power to one or more of the loads 202 during brown-out or dropped phase conditions. Examples of power quality monitoring may include reporting (e.g., via graph) on voltage supplied, frequency supplied, harmonics observed, and/or other power quality metrics.

The load identification module 312 may be configured to obtain an identity of at least one of the loads 202. In some implementations, the identity is sensed based on usage profiles of a given load 202. The identity may be provided by a user, such as via the interface module 306. The identity may be transmitted directly from the load 202, via an intelligent switch 208, and/or via an intelligent outlet 210.

The power conservation module 314 may be configured to generate instructions for other constituent components of the local power network 102 (e.g., the intelligent distribution board 206, the intelligent switches 208, and/or the intelligent outlets 210). The generated instructions may be intended to effectuate energization and deactivation of one or more circuits in the local power network 102 and/or one or more of the loads 202. The generated instructions may be based at least in part on any number of power management parameters. For example, the generated instructions may be based at least in part on the identity of at least one of the loads 202. The generated instructions may be based at least in part one power management parameters of the scheduling sub-module 316, the business rules sub-module 318, and/or the usage profile sub-module 320.

The scheduling sub-module 316 may be configured to manage a schedule associated with at least one of the loads 202. Such a schedule may be indicative of time periods of energization and deactivation of the one or more circuits and/or the one or more of the loads 202. For example, a schedule may indicate that a circuit containing a particular load is to be deactivated from 1:00 AM to 5:00 AM on weekdays. A schedule may be statically or dynamically established, and may be based at least in part on one or more of preset time periods, occupancy sensors, daylight sensors, computed dusk/dawn time, holiday schedules, and/or any other timing indicator. The instructions generated by the power conservation module 314 may be based at least in part on the schedule.

The business rules sub-module 318 may be configured to manage one or more business rules associated with the local power network 102. A business rule may be a statement that defines or constrains some aspect of a business. A business rule may be intended to assert business structure or to control or influence the behavior of a business. Individual business rules that describe the same facet of a business may be arranged into business rule sets. Business rules may describe operations, definitions, and constraints that apply the loads 202 or various circuits to aid a business in achieving its goals.

The instructions generated by the power conservation module 314 may be based at least in part on the business rules.

The usage profile sub-module 320 may be configured to determine time periods of energization and deactivation of one or more circuits and/or one or more of the loads 202 based at least in part on a usage profile of one or more of the loads 202. A usage profile, for example, may include a historical usage pattern of a particular load 202. As an illustration, when the usage profile sub-module 320 determines, based on power consumption or some other factor, that a given load 202 is in standby mode during certain times, the usage profile sub-module 320 may inform the power conservation module 314 to generate instructions to deactivate that given load 202 during those certain times.

The artificial intelligence sub-module 322 may be configured to adaptively manage goals associated with power utilization. More specifically, power utilization may be controlled to achieve one or more desired goals such as meeting a power usage limit, budget constraints, and/or safety targets. Goals may be default goals, specified by a user, downloaded, configured automatically, and/or obtained by any other manner or from any source. The artificial intelligence sub-module 322 may observe an environment of the local power network 102 to determine routines and to respond accordingly. For example, the artificial intelligence sub-module 322 may determine when to turn up an HVAC thermostat and/or when to turn on a water heater in order to have ambient and/or water temperatures at a desired level at a learned time (e.g., when an alarm clock is expected to sound). The artificial intelligence sub-module 322 may be configured manage and/or schedule power utilization by loads 202 based at least in part on external events and/or input. Examples of load management based on external events/input may include controlling lights based on a photo sensor; turning on all lights when a fire alarm sounds; turning off a range, oven, furnace, and so on when a fire alarm sounds; and/or turning on all interior lights and flash exterior lights when a security system alarm sounds. The instructions generated by the power conservation module 314 may be based at least in part on goals managed by the artificial intelligence sub-module 322.

Figure 4:
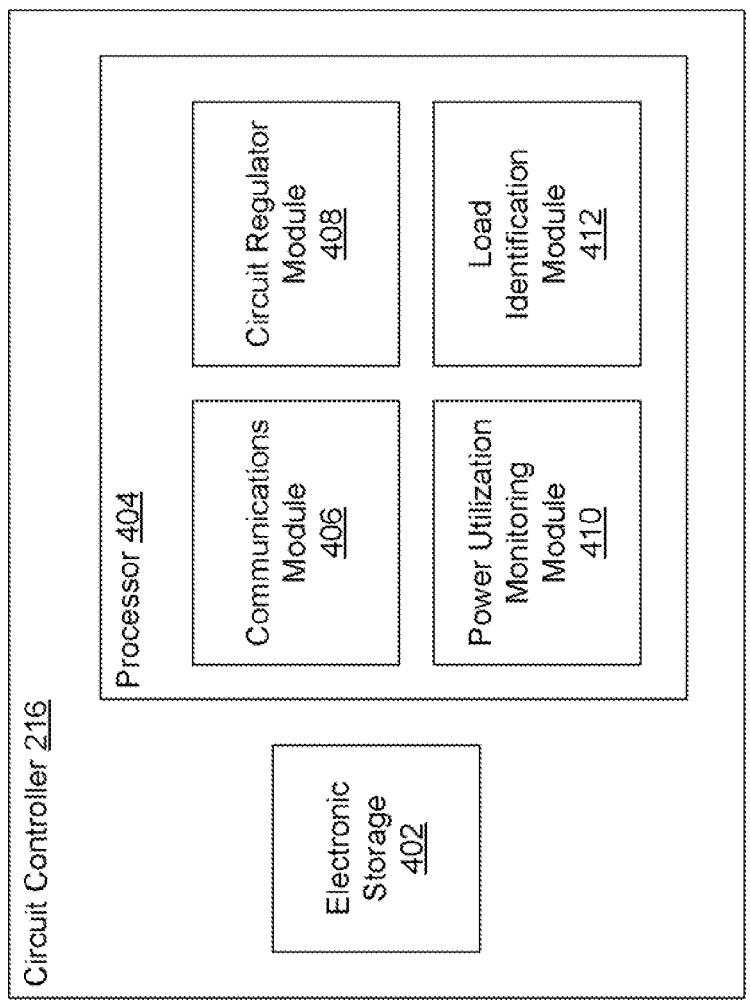
FIG. 4 illustrates an exemplary implementation of a circuit controller.

FIG. 4 illustrates an exemplary implementation of the circuit controller 216 described in connection with FIG. 2. The circuit controller 216 may be configured to control various aspects of the distribution board 214 described in connection with FIG. 2. For example, the circuit controller 216 may be configured to reversibly effectuate energization and deactivation of one or more circuits to which the distribution board 214 divides power. The circuit controller 216 may include an electronic storage 402 and a processor 404.

Electronic storage 402 may include electronic storage media that electronically stores information. The electronically storage media of electronic storage 402 may include one or both of system storage that is provided integrally (i.e., substantially non-removable) with the circuit controller 216 and/or removable storage that is removably connectable to the circuit controller 216 via, for example, a port (e.g., a USB port, a firewire port, etc.) or a drive (e.g., a disk drive, etc.). Electronic storage 402 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 402 may store software algorithms, information determined by the processor 404, information received via a user interface such as that which may be provided by computing device 108 or a user interface integral with the power management system 204, and/or other information that enables the circuit controller 216 to function properly. Electronic storage 402 may be a separate component within the circuit controller 216, or electronic storage 402 may be provided integrally with one or more other components of the circuit controller 216 (e.g., the processor 404).

The processor 404 may be configured to provide information processing capabilities in the circuit controller 216. As such, the processor 404 may include one or more of a digital processor, an analog processor, a digital circuit designed to process information, an analog circuit designed to process information, a state machine, and/or other mechanisms for electronically processing information. Although the processor 404 is shown in FIG. 4 as a single entity, this is for illustrative purposes only. In some implementations, the processor 404 may include a plurality of processing units. These processing units may be physically located within the same device, or the processor 404 may represent processing functionality of a plurality of devices operating in coordination.

As is shown in FIG. 4, the processor 404 may be configured to execute one or more computer program modules. The one or more computer program modules may include one or more of a communications module 406, a circuit regulator module 408, a power utilization monitoring module 410, a load identification module 412, and/or other modules/sub-modules. The processor 404 may be configured to execute modules 406, 408, 410, and/or 412 by software; hardware; firmware; some combination of software, hardware, and/or firmware; and/or other mechanisms for configuring processing capabilities on the processor 404.

It should be appreciated that although modules 406, 408, 410, and 412 are illustrated in FIG. 4 as being co-located within a single processing unit, in implementations in which the processor 404 includes multiple processing units, one or more of modules 406, 408, 410, and/or 412 may be located remotely from the other modules. The description of the functionality provided by the different modules 406, 408, 410, and/or 412 described below is for illustrative purposes, and is not intended to be limiting, as any of modules 406, 408, 410, and/or 412 may provide more or less functionality than is described. For example, one or more of modules 406, 408, 410, and/or 412 may be eliminated, and some or all of its functionality may be provided by other ones of modules 406, 408, 410, and/or 412. As another example, the processor 404 may be configured to execute one or more additional modules and/or sub-modules that may perform some or all of the functionality attributed below to one of modules 406, 408, 410, and/or 412.

The communications module 406 may be configured to transfer information (e.g., instruction) to and from the power management system 204 via a communicative connection. For example, the communications module 406 may receive an instruction from the power management system 204 to energize or deactivate one or more circuits to which the distribution board 214 divides power among. As mentioned herein, communicative connections may include any means for sending, receiving, and/or exchanging information between two or more constituent components of the local power network 102.

The circuit regulator module 408 may be configured to reversibly effectuate energization and deactivation of the one or more circuits and/or one or more of the loads 202 in response to instructions received from the power management system 204. For example, execution of the circuit regulator module 408 may cause a breaker having controlled switching capability included in the distribution board 214 to deactivate a particular circuit in response to a received instruction to deactivate a given load 202 contained in that particular circuit.

The power utilization monitoring module 410 may be configured to determine an indication of an amount of power utilized by at least one circuit or at least one of the loads 202. Such a determination may be made through direct monitoring of power utilization. Additionally or alternatively, the indication may be transmitted to the power management system 204 via the communications module 406.

The load identification module 412 may be configured to obtain an identity of at least one of the loads 202. In some implementations, the identity is sensed based on usage profiles of a given load 202. The identity may be provided by a user. The identity may be received directly from the load 202. The identity may be transmitted to the power management system 204 via the communications module 406.

Figure 5:
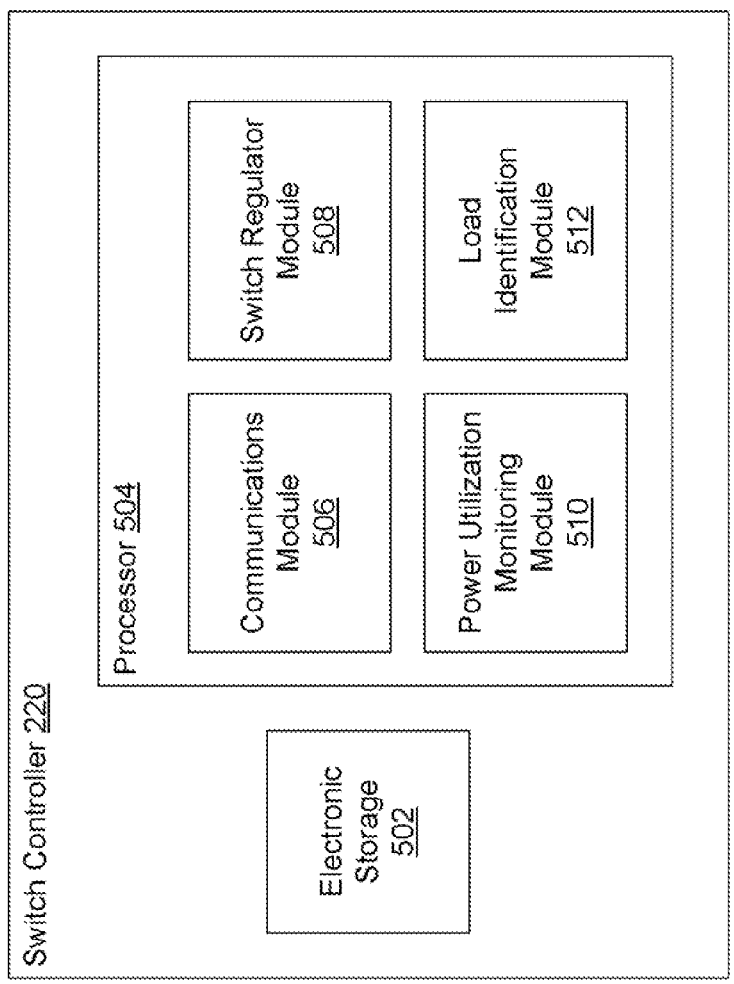
FIG. 5 illustrates an exemplary implementation of a switch controller.

FIG. 5 illustrates an exemplary implementation of the switch controller 220 described in connection with FIG. 2. The switch controller 220 may be configured to control the switch 218 described in connection with FIG. 2. For example, the switch controller 220 may be configured to reversibly effectuate energization and deactivation of one or more loads 202 connected with an associated switch 218. The switch controller 220 may include an electronic storage 502 and a processor 504.

Electronic storage 502 may include electronic storage media that electronically stores information. The electronically storage media of electronic storage 502 may include one or both of system storage that is provided integrally (i.e., substantially non-removable) with the switch controller 220 and/or removable storage that is removably connectable to the switch controller 220 via, for example, a port (e.g., a USB port, a firewire port, etc.) or a drive (e.g., a disk drive, etc.). Electronic storage 502 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 502 may store software algorithms, information determined by the processor 504, information received via a user interface such as that which may be provided by computing device 108 or a user interface integral with the power management system 204, and/or other information that enables the switch controller 220 to function properly. Electronic storage 502 may be a separate component within the switch controller 220, or electronic storage 502 may be provided integrally with one or more other components of the switch controller 220 (e.g., the processor 504).

The processor 504 may be configured to provide information processing capabilities in the switch controller 220. As such, the processor 504 may include one or more of a digital processor, an analog processor, a digital circuit designed to process information, an analog circuit designed to process information, a state machine, and/or other mechanisms for electronically processing information. Although the processor 504 is shown in FIG. 5 as a single entity, this is for illustrative purposes only. In some implementations, the processor 504 may include a plurality of processing units. These processing units may be physically located within the same device, or the processor 504 may represent processing functionality of a plurality of devices operating in coordination.

As is shown in FIG. 5, the processor 504 may be configured to execute one or more computer program modules. The one or more computer program modules may include one or more of a communications module 506, a switch regulator module 508, a power utilization monitoring module 510, a load identification module 512, and/or other modules/sub-modules. The processor 504 may be configured to execute modules 506, 508, 510, and/or 512 by software; hardware; firmware; some combination of software, hardware, and/or firmware; and/or other mechanisms for configuring processing capabilities on the processor 504.

It should be appreciated that although modules 506, 508, 510, and 512 are illustrated in FIG. 5 as being co-located within a single processing unit, in implementations in which the processor 504 includes multiple processing units, one or more of modules 506, 508, 510, and/or 512 may be located remotely from the other modules. The description of the functionality provided by the different modules 506, 508, 510, and/or 512 described below is for illustrative purposes, and is not intended to be limiting, as any of modules 506, 508, 510, and/or 512 may provide more or less functionality than is described. For example, one or more of modules 506, 508, 510, and/or 512 may be eliminated, and some or all of its functionality may be provided by other ones of modules 506, 508, 510, and/or 512. As another example, the processor 504 may be configured to execute one or more additional modules and/or sub-modules that may perform some or all of the functionality attributed below to one of modules 506, 508, 510, and/or 512.

The communications module 506 may be configured to transfer information (e.g., instruction) to and from the power management system 204 via a communicative connection. For example, the communications module 506 may receive an instruction from the power management system 204 to energize or deactivate a load connected to an associated switch 218. As mentioned herein, communicative connections may include any means for sending, receiving, and/or exchanging information between two or more constituent components of the local power network 102.

The switch regulator module 508 may be configured to reversibly effectuate energization and deactivation of one or more of the loads 202 connected to an associated switch 218 in response to instructions received from the power management system 204. For example, execution of the switch regulator module 508 may cause a switch to be actuated to deactivate a particular load 202 in response to a received instruction to deactivate that given load 202.

The power utilization monitoring module 510 may be configured to determine an indication of an amount of power utilized by at least one of the loads 202. Such a determination may be made through direct monitoring of power utilization. Additionally or alternatively, the indication may be transmitted to the power management system 204 via the communications module 506.

The load identification module 512 may be configured to obtain an identity of at least one of the loads 202. In some implementations, the identity is sensed based on usage profiles of a given load 202. The identity may be provided by a user. The identity may be received directly from the load 202. The identity may be transmitted to the power management system 204 via the communications module 506.

Figure 6:
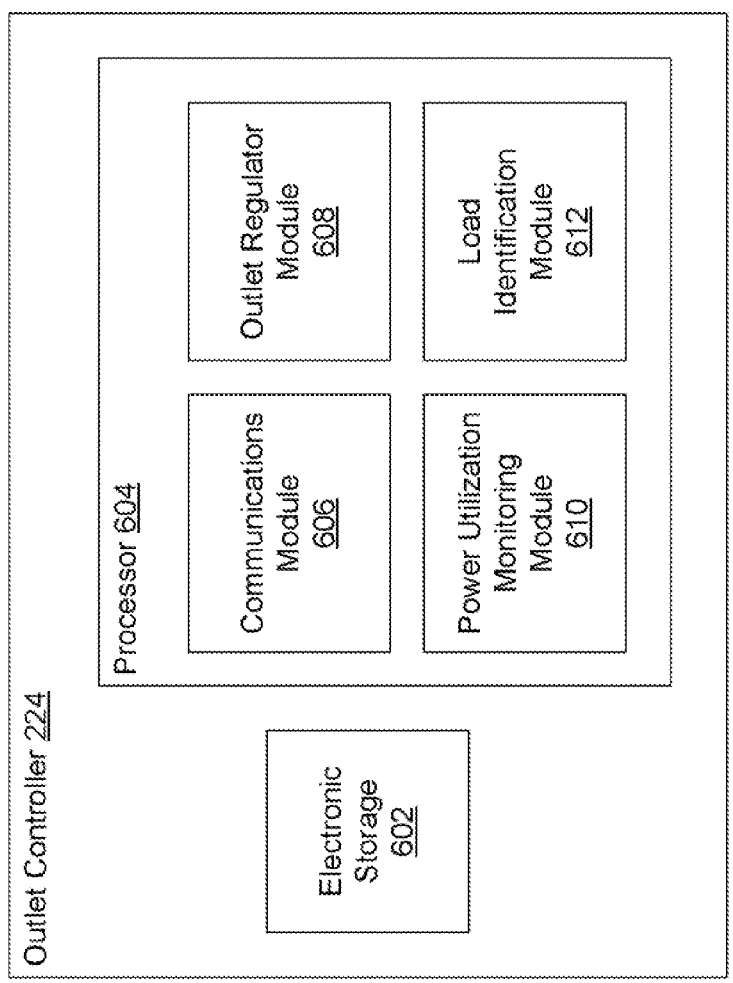
FIG. 6 illustrates an exemplary implementation of an outlet controller.

FIG. 6 illustrates an exemplary implementation of the outlet controller 224 described in connection with FIG. 2. The outlet controller 224 may be configured to control an aspect of the outlet receptacle 222 described in connection with FIG. 2. For example, the outlet controller 224 may be configured to reversibly effectuate energization and deactivation of one or more loads 202 connected to an associated outlet receptacle 222. The outlet controller 224 may include an electronic storage 602 and a processor 604.

Electronic storage 602 may include electronic storage media that electronically stores information. The electronically storage media of electronic storage 602 may include one or both of system storage that is provided integrally (i.e., substantially non-removable) with the outlet controller 224 and/or removable storage that is removably connectable to the outlet controller 224 via, for example, a port (e.g., a USB port, a firewire port, etc.) or a drive (e.g., a disk drive, etc.). Electronic storage 602 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 602 may store software algorithms, information determined by the processor 604, information received via a user interface such as that which may be provided by computing device 108 or a user interface integral with the power management system 204, and/or other information that enables the outlet controller 224 to function properly. Electronic storage 602 may be a separate component within the outlet controller 224, or electronic storage 602 may be provided integrally with one or more other components of the outlet controller 224 (e.g., the processor 604).

The processor 604 may be configured to provide information processing capabilities in the outlet controller 224. As such, the processor 604 may include one or more of a digital processor, an analog processor, a digital circuit designed to process information, an analog circuit designed to process information, a state machine, and/or other mechanisms for electronically processing information. Although the processor 604 is shown in FIG. 6 as a single entity, this is for illustrative purposes only. In some implementations, the processor 604 may include a plurality of processing units. These processing units may be physically located within the same device, or the processor 604 may represent processing functionality of a plurality of devices operating in coordination.

As is shown in FIG. 6, the processor 604 may be configured to execute one or more computer program modules. The one or more computer program modules may include one or more of a communications module 606, a outlet regulator module 608, a power utilization monitoring module 610, a load identification module 612, and/or other modules/sub-modules. The processor 604 may be configured to execute modules 606, 608, 610, and/or 612 by software; hardware; firmware; some combination of software, hardware, and/or firmware; and/or other mechanisms for configuring processing capabilities on the processor 604.

It should be appreciated that although modules 606, 608, 610, and 612 are illustrated in FIG. 6 as being co-located within a single processing unit, in implementations in which the processor 604 includes multiple processing units, one or more of modules 606, 608, 610, and/or 612 may be located remotely from the other modules. The description of the functionality provided by the different modules 606, 608, 610, and/or 612 described below is for illustrative purposes, and is not intended to be limiting, as any of modules 606, 608, 610, and/or 612 may provide more or less functionality than is described. For example, one or more of modules 606, 608, 610, and/or 612 may be eliminated, and some or all of its functionality may be provided by other ones of modules 606, 608, 610, and/or 612. As another example, the processor 604 may be configured to execute one or more additional modules and/or sub-modules that may perform some or all of the functionality attributed below to one of modules 606, 608, 610, and/or 612.

The communications module 606 may be configured to transfer information (e.g., instruction) to and from the power management system 204 via a communicative connection. For example, the communications module 606 may receive an instruction from the power management system 204 to energize or deactivate a load connected to an associated outlet receptacle 222. As mentioned herein, communicative connections may include any means for sending, receiving, and/or exchanging information between two or more constituent components of the local power network 102.

The outlet regulator module 608 may be configured to reversibly effectuate energization and deactivation of one or more of the loads 202 connected to an associated outlet receptacle 222 in response to instructions received from the power management system 204. For example, execution of the outlet regulator module 608 may cause an internal switching mechanism of an associated intelligent outlet 210 to be actuated to deactivate a particular load 202 in response to a received instruction to deactivate that given load 202.

The power utilization monitoring module 610 may be configured to determine an indication of an amount of power utilized by at least one of the loads 202. Such a determination may be made through direct monitoring of power utilization. Additionally or alternatively, the indication may be transmitted to the power management system 204 via the communications module 606.

The load identification module 612 may be configured to obtain an identity of at least one of the loads 202. In some implementations, the identity is sensed based on usage profiles of a given load 202. The identity may be provided by a user. The identity may be received directly from the load 202. The identity may be transmitted to the power management system 204 via the communications module 606.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A power management system configured to manage power utilization of one or more of loads within a local power network of a building structure, vessel, or vehicle, the power management system comprising:

a communicative connection configured to be communicatively coupled with a circuit controller of a distribution board permanently installed in one of a building structure, a vessel, or a vehicle, the distribution board being configured to divide electrical power among one or more circuits each configured to contain at least one load, the circuit controller being configured to reversibly effectuate energization and deactivation of individual ones of the one or more circuits, wherein a given load is electrically coupled with a given circuit via a lighting fixture or an outlet receptacle permanently installed in the building structure, the vessel, or the vehicle in which the distribution board is permanently installed; and one or more processors configured to execute computer program modules, the computer program modules comprising:

an interface module configured to provide a web-based graphical user interface for presentation to a user, the web-based graphical user interface being accessible via individual ones of a plurality of personal computing devices each being entirely discrete and separate from the power management system, the web-based graphical user interface being configured to receive, from the user, a set of power management parameters including a total power usage limit associated with one or both of at least one load or at least one circuit;

a power conservation module configured to generate instructions for the circuit controller, the generated instructions being configured to effectuate energization and deactivation of the one or more circuits by the circuit controller, wherein the generated instructions are based on the total power usage limit; and a communications module configured to transmit the generated instructions from the power management system to the circuit controller via the communicative connection.

2. The power management system of claim 1, wherein the computer program modules further comprise a power utilization monitoring module configured to determine an amount of power utilized by the at least one load.

3. The power management system of claim 2, wherein the power utilization monitoring module is further configured to calculate an electric bill estimation based at least in part on the amount of power utilized by the at least one load.

4. The power management system of claim 1, wherein the computer program modules further comprise a load identification module configured to obtain an identity of the at least one load, the generated instructions being based at least in part on the identity of the at least one load.

5. The power management system of claim 1, wherein the power conservation module includes a scheduling sub-module configured to manage a schedule associated with the at least one load, the schedule indicative of time periods of energization and deactivation of the one or more circuits, the generated instructions being based at least in part on the schedule.

6. The power management system of claim 1, wherein the power conservation module includes a business rules sub-module configured to manage one or more business rules, the generated instructions based at least in part on the one or more business rules.

7. The power management system of claim 1, wherein the power conservation module includes a usage profile sub-module configured to determine time periods of energization and deactivation of the one or more circuits based at least in part on a usage profile of the at least one load.

8. The power management system of claim 1, wherein the power conservation module includes an artificial intelligence sub-module configured to adaptively manage goals associated with power utilization.

9. The power management system of claim 1, wherein the communicative connection includes a power line that facilitates power line communication.

10. A circuit controller configured to control a distribution board that divides electrical power among one or more circuits each configured to contain at least one load within a local power network of a building structure, vessel, or vehicle, the circuit controller comprising:

a communicative connection configured to be communicatively coupled with a power management system, the power management system configured (1) to receive, from a user via a web-based graphical user interface provided by an interface module included in the power management system, a set of power management parameters including a total power usage limit associated with one or both of at least one load or at least one circuit, the web-based graphical user interface being accessible via individual ones of a plurality of personal computing devices each being entirely discrete and separate from the power management system and the circuit controller, (2) to generate instructions for the circuit controller to effectuate energization and deactivation of the one or more circuits based on the total power usage limit, and (3) to transmit the generated instructions from the power management system to the circuit controller, wherein the distribution board is permanently installed in one of a building structure, a vessel, or a vehicle, and wherein a given load is electrically coupled with a given circuit via a lighting fixture or an outlet receptacle permanently installed in the building structure, the vessel, or the vehicle in which the distribution board is permanently installed; and one or more processors configured to execute computer program modules, the computer program modules comprising:

a communications module configured to receive the generated instructions from the power management system via the communicative connection; and a circuit regulator module configured to reversibly effectuate energization and deactivation of the one or more circuits in response to the generated instructions.

11. The circuit controller of claim 10, wherein the computer program modules further comprise a power utilization monitoring module configured to determine an indication of an amount of power utilized by the at least one load, and wherein the communications module is further configured to transmit the indication to the power management system.

12. The circuit controller of claim 10, wherein the computer program modules further comprise a load identification module configured to determine an identity of the at least one load, and wherein the communications module is further configured to transmit the identity of the at least one load to the power management system.

13. The circuit controller of claim 10, wherein the generated instructions are based at least in part on the identity of the at least one load.

14. A switch controller configured to control a switch configured to be electrically coupled with at least one load within a local power network of a building structure, vessel, or vehicle, the switch controller comprising:

a communicative connection configured to be communicatively coupled with a power management system, the power management system configured (1) to receive, from a user via a web-based graphical user interface provided by an interface module included in the power management system, a set of power management parameters including a total power usage limit associated with one or both of at least one load or at least one circuit, the web-based graphical user interface being accessible via individual ones of a plurality of personal computing devices each being entirely discrete and separate from the power management system and the switch controller, (2) to generate instructions for the switch controller to effectuate energization and deactivation of at least one load based on the total power usage limit, and (3) to transmit the generated instructions from the power management system to the switch controller, wherein the switch is permanently installed in one of a building structure, a vessel, or a vehicle, and wherein a given load is electrically coupled with a given circuit via a lighting fixture or an outlet receptacle permanently installed in the building structure, the vessel, or the vehicle in which the switch is permanently installed; and one or more processors configured to execute computer program modules, the computer program modules comprising:
- a communications module configured to receive the generated instructions from the power management system via the communicative connection; and
- a switch regulator module configured to reversibly effectuate energization and deactivation of the at least one load electrically coupled to the switch in response to the generated instructions by reversibly effectuating energization and deactivation of the switch and/or by modulating the switch.

15. The switch controller of claim 14, wherein the computer program modules further comprise a power utilization monitoring module configured to determine an indication of an amount of power utilized by the at least one load, and wherein the communications module is further configured to transmit the indication to the power management system.

16. The switch controller of claim 14, wherein the computer program modules further comprise a load identification module configured to determine an identity of the at least one load, and wherein the communications module is further configured to transmit the identity of the at least one load to the power management system.

17. The switch controller of claim 16, wherein the generated instructions are based at least in part on the identity of the at least one load.

18. An outlet controller configured to control an outlet receptacle configured to be electrically coupled with at least one load within a local power network of a building structure, vessel, or vehicle, the outlet controller comprising:
- a communicative connection configured to be communicatively coupled with a power management system, the power management system configured (1) to receive, from a user via a web-based graphical user interface provided by an interface module included in the power management system, a set of power management parameters including a total power usage limit associated with one or both of at least one load or at least one circuit, the web-based graphical user interface being accessible via individual ones of a plurality of personal computing devices each being entirely discrete and separate from the power management system and the outlet controller, (2) to generate instructions for the outlet controller to effectuate energization and deactivation of the at least one load based on the total power usage limit, and (3) to transmit the generated instructions from the power management system to the outlet controller, wherein the outlet receptacle is permanently installed in one of a building structure, a vessel, or a vehicle; and one or more processors configured to execute computer program modules, the computer program modules comprising:
- a communications module configured to receive the generated instructions from the power management system via the communicative connection; and
- an outlet regulator module configured to reversibly effectuate energization and deactivation of the at least one load electrically coupled to the outlet receptacle in response to the generated instructions by reversibly effectuating energization and deactivation of the outlet receptacle.

19. The outlet controller of claim 18, wherein the computer program modules further comprise a power utilization monitoring module configured to determine an indication of an amount of power utilized by the at least one load, and wherein the communications module is further configured to transmit the indication to the power management system.

20. The outlet controller of claim 18, wherein the computer program modules further comprise a load identification module configured to determine an identity of the at least one load, and wherein the communications module is further configured to transmit the identity of the at least one load to the power management system.

21. The outlet controller of claim 20, wherein the generated instructions are based at least in part on the identity of the at least one load.

* * * * *